United States Patent

[11] 3,597,850

| | | |
|---|---|---|
| [72] | Inventor | John W. Jenkins<br>Clayton County, Ga. |
| [21] | Appl. No. | 18,618 |
| [22] | Filed | Mar. 11, 1970 |
| [45] | Patented | Aug. 10, 1971 |
| [73] | Assignee | National Service Industries, Inc.<br>Atlanta, Ga.<br>Continuation-in-part of application Ser. No. 706,965, Feb. 20, 1968, now abandoned. |

[54] CONTINUOUS VACUUM DRIER
17 Claims, 6 Drawing Figs.

[52] U.S. Cl. ............................................. 34/10, 34/57 A
[51] Int. Cl. ............................................. F26b 3/08, F26b 17/00
[50] Field of Search .................................. 34/10, 15, 22, 57 R, 57 A, 82

[56] References Cited
UNITED STATES PATENTS

| | | | |
|---|---|---|---|
| 3,075,298 | 1/1963 | Schaub | 34/57 A X |
| 3,207,820 | 9/1965 | Scarvelis et al. | 34/10 X |
| 3,212,197 | 10/1965 | Crawford | 34/10 |
| 3,273,873 | 9/1966 | Stanchel | 34/57 A X |
| 3,423,841 | 1/1969 | Ocker | 34/22 |

*Primary Examiner*—Charles J. Myhre
*Attorney*—Owen & Owen

ABSTRACT: A continuous vacuum drier for removing moisture from solid synthetic resins in granular form prior to manufacturing into finished products. The synthetic resinous material is continuously supplied to the top of a closed drying hopper and removed from the bottom of the hopper. In one embodiment air withdrawn from the top of the hopper is circulated through a heater and is returned to the bottom of the hopper, where it travels upwardly through the synthetic resinous material in the hopper. In a second embodiment, air is withdrawn from the bottom of the hopper and is returned to the top of the hopper, where it travels downwardly through the synthetic resinous material in the hopper. The circulated air and the material in the hopper are heated as they pass grids of pipes which are heated by circulated hot water. In both embodiments, a vacuum pump is connected to reduce the air pressure in the system for increasing the efficiency of the drier and for causing the hopper to automatically fill with material to a predetermined level from a primary feeder hopper. A small amount of dry air may be introduced into the hopper for carrying off evaporated moisture. The dry material is fed by gravity from the bottom of the hopper to a processor.

Patented Aug. 10, 1971
3,597,850
4 Sheets-Sheet 1
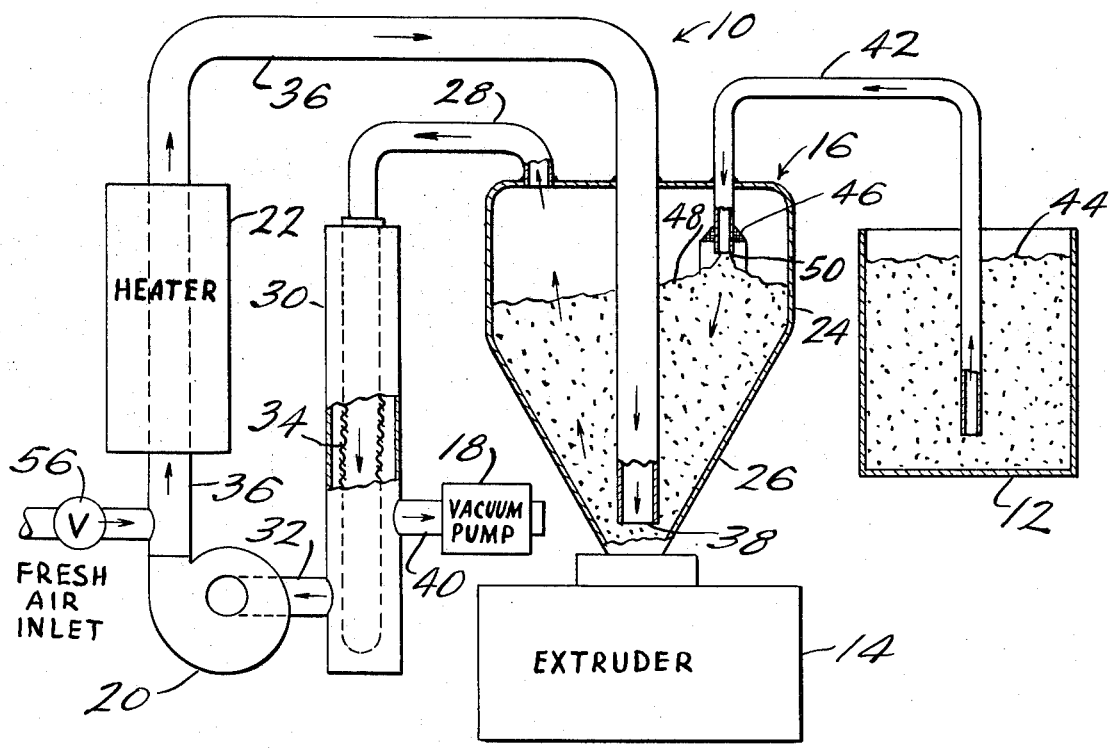
FIG-1-
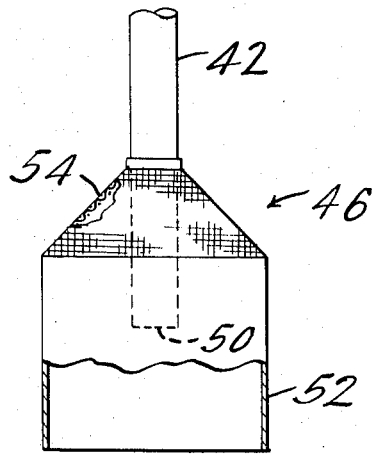
FIG-2-
INVENTOR:
JOHN W. JENKINS.
BY
Owen + Owen
ATT'YS.

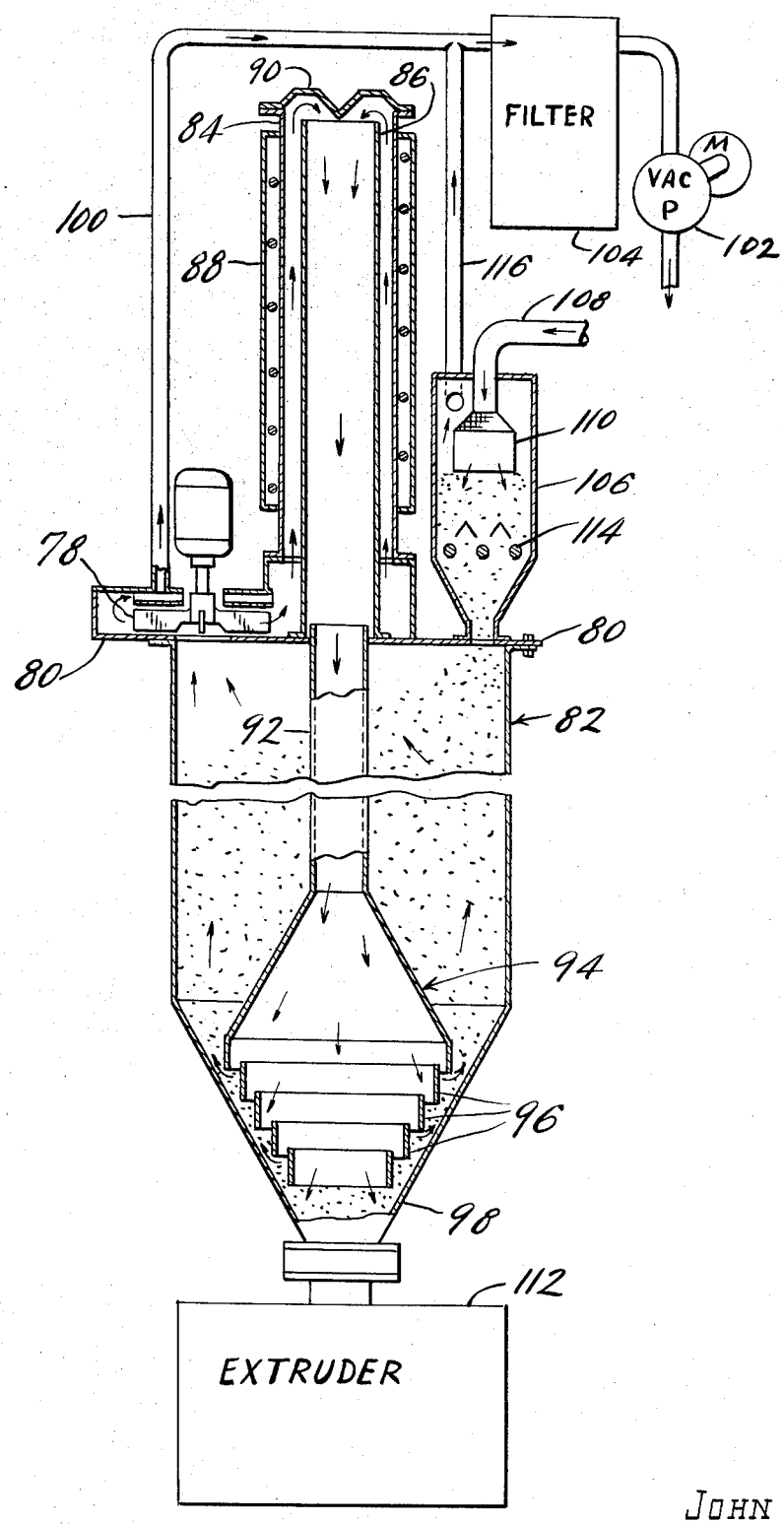

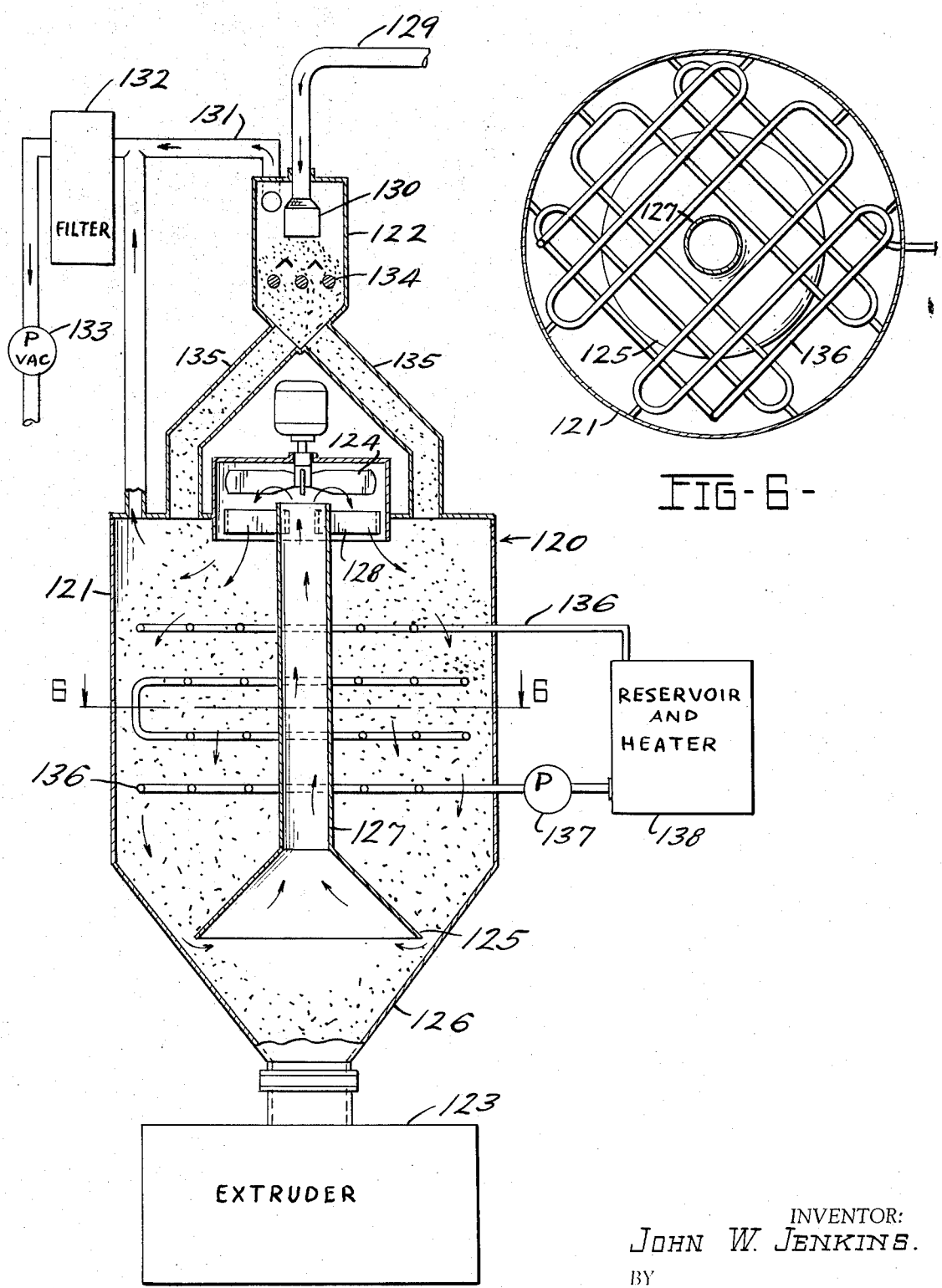

3,597,850

CONTINUOUS VACUUM DRIER

CROSS-REFERENCE TO RELATED APPLICATION

This is a continuation-in-part of my copending application Ser. No. 706,965, filed Feb. 20, 1968, now abandoned.

BACKGROUND OF THE INVENTION

This invention relates generally to an improved drier for synthetic resinous materials, and particularly to an apparatus for continuously drying synthetic resinous materials prior to feeding to an extruder, injection molder or other processor.

When granulated synthetic resinous material remains in a container, except when hermetically sealed, it picks up a film of moisture on each granule of the material unless the surrounding air is extremely dry. It appears that reground material is particularly vulnerable due to its attraction for moisture vapor by a static charge on the granules and due to the rough surfaces on the granules. In addition, some materials are hygroscopic, i.e., they absorb or soak up moisture beneath the surface of the granules. Among these are acrylic (slightly absorbent), nylon, polycarbonate, and polystyrene when it is modified with rubber. In addition, nonhygroscopic plastics tend to become hygroscopic when colored with carbon black.

Moisture makes it difficult or impossible to manufacture defect-free finished products from the resins. In injection molding, moisture may cause a frothing at the nozzle which will be reflected in a silvery streaked appearance of the molding, and sometimes in bubbles in the molding. In extrusion, the effects of moisture in the resins are much more severe. Within the extruder barrel, pressure may reach several thousand pounds per square inch at temperatures ranging from 350° F. to 600° F. Under these conditions moisture is liquid. When the extrudate is relieved of pressure in the die and at the die exit, the temperature of the extrudate will still be well above the boiling point of water and the extrudate will be molten. Residual moisture then expands to steam and remains steam at the temperature at which the resin solidifies. As a result, bubbles appear in the clear material and moisture lines appear on the surface. In severe cases, steam bubbles will cause a lumpy surface in the extrudate.

To avoid this, most of the moisture must be removed before the resin is fed to an injection molder or an extruder. Efforts have been made to dry individual batches of resin by circulating warm air through it. But this has been inadequate with hygroscopic materials on hot, humid days, even when the air is heated near the softening temperature of the material. The common practice is to predry the circulating air through a desiccant, e.g., silica gel, or through a molecular sieve. It is desirable to bring the dew point of the air to about −20° F. A defect in molecular sieve air driers is that resin dust and monomer can clog the sieve and render it worthless. Therefore, a psychrometer reading must be made periodically to determine if the drier is functioning. The prior art driers are of the batch type. Since a single processor may use several hundred pounds of dry resin per hour, a number of batch driers are required to supply a sufficient, continuous source of dry resin.

SUMMARY OF THE INVENTION

The drier of the present invention includes a drying hopper, a vacuum pump, an air-circulating blower and a heater. The drying hopper is placed for continuously receiving and discharging granular particles of synthetic resinous materials flowing to a processor, such as an extruder or an injection molder. The circulating blower forces heated air to flow through the material in the drying hopper. In one embodiment the air is heated by an external heater and the hot air heats and dries the material in the hopper as it is circulated through the hopper. In a second embodiment the air and the material are both heated as they pass through grids of pipes in the hopper. The pipes are heated by circulated hot water.

A vacuum pump maintains the system at a reduced pressure for several purposes. Since the rate at which moisture is vaporized is an inverse function of air pressure, the system is more effective. The reduced pressure in the drying hopper also reduces the amount of air fed to the processor with the dry material, and thereby reduces the possibility of air bubbles in the finished product. Finally, the reduced pressure can be used for maintaining a predetermined amount of material in the drying hopper. This is done in one of several ways. In one embodiment a filler tube extends from a material source, through the top of the hopper, to the predetermined level. When the end of the filler tube is exposed, the reduced pressure is sufficient to pull the material into the hopper. When the hopper is filled to the predetermined level, the end of the filler tube is covered, thereby stopping the material flow into the hopper. In another embodiment a filler tube extends from a material source, through a control valve, to a hopper feeder which is connected through one or more conduits for gravity feed to the drying hopper. A level sensor, located at the predetermined level in the drying hopper, is connected to a control circuit which operates the control valve. In the alternative, the material level in the hopper feeder can be controlled by the location of the end of the filler tube in the hopper feeder.

Additional fresh air or gas can be introduced into the system through an inlet valve. As the vacuum pump removes the fresh air from the system, it carries off moisture evaporated from the material being dried. It is preferable to introduce the fresh air into the system at a point before the heater, such that the fresh air is heated and circulated through the hopper before it is removed by the vacuum pump. For maximum drying, the air is dehumidified before it is introduced into the system.

Accordingly, it is an object of the present invention to provide a continuous drier for removing moisture from granular synthetic resins flowing to a processor.

Another object of the invention is to provide an automatic feed system for maintaining a predetermined material level in a vacuum drier, even though material is continuously removed from the drier.

Other objects and advantages of the invention will become apparent in the following detailed description of the preferred form thereof, reference being had to the accompanying drawings.

BRIEF DESCRIPTION OF THE DRAWINGS

FIG. 1 is a flow diagram showing a first embodiment of the invention;

FIG. 2 is a side view of the filler head used to maintain a predetermined material level in the drying hopper;

FIG. 4 is a partially cutaway view showing apparatus employing a third embodiment of the invention;

FIG. 5 is a partially cutaway view showing apparatus employing a fourth and preferred embodiment of the invention; and FIG. 6 is a cross-sectional view taken along line 6–6 in FIG. 5.

DESCRIPTION OF THE PREFERRED EMBODIMENTS

Figure 3:
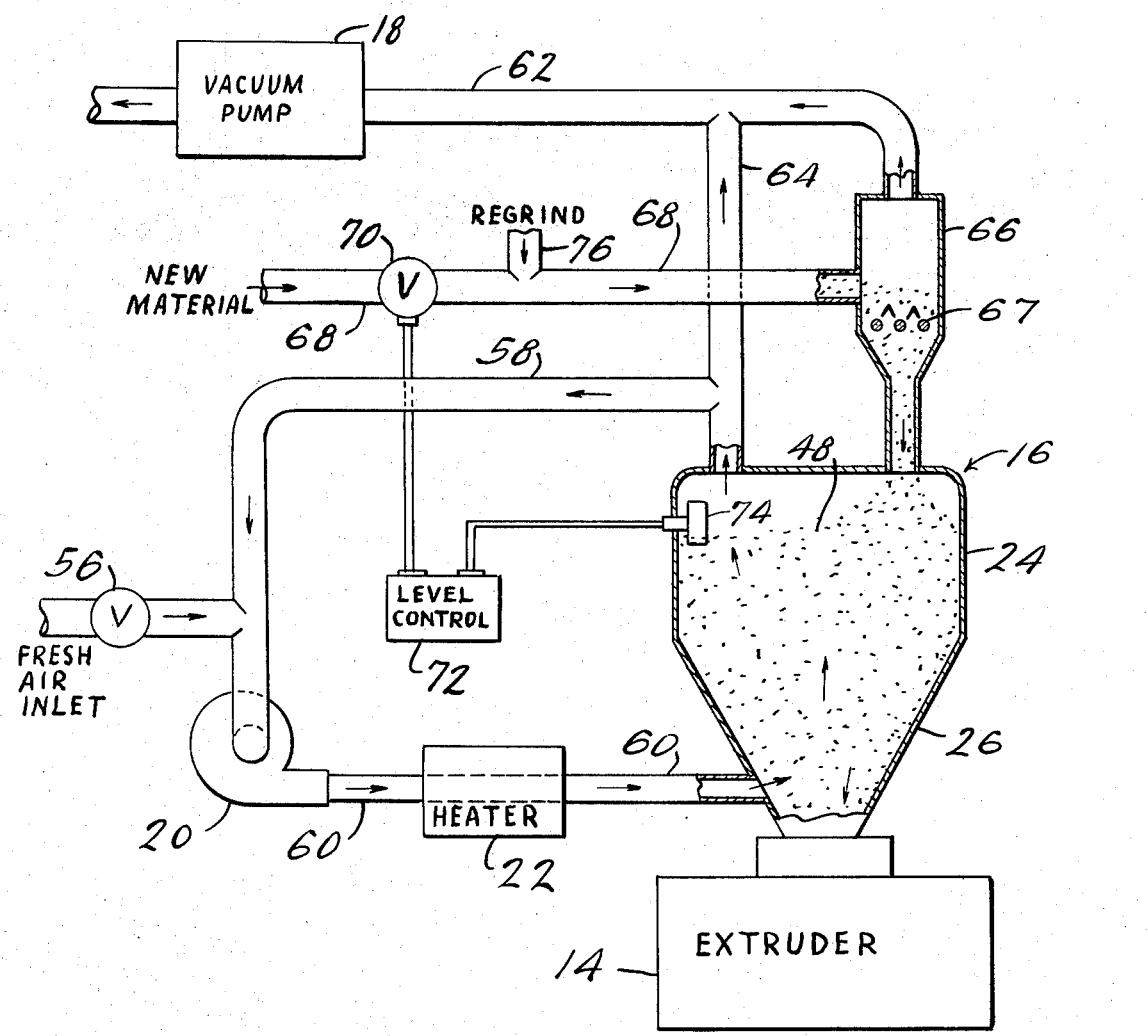
FIG. 3 is a flow diagram showing a second embodiment of the invention.

Referring now to the flow diagram of FIG. 1, the vacuum drier, generally referred to at 10, is a closed system connected between a supply bin or primary feeder hopper 12 and an extruder 14. The vacuum drier 10 generally comprises a drying hopper 16, a vacuum pump 18, an air-circulating blower 20 and a heater 22.

The drying process generally includes circulating air from the top of the drying hopper 16 through a heater 22 and returning it to the bottom of hopper 16, where it flows upwardly through the granular synthetic resinous material held in the hopper. The drier is made more effective by reducing the pressure of the circulated air, since this increases the rate of moisture vaporization into the air, without taking any moisture out of the air. If the absolute pressure is dropped far enough, i.e., below the vapor pressure of water at a given temperature, the air becomes unsaturable, and the factors controlling drying capacity are altered radically. Thus, the required residence time for the material in the drying hopper is greatly reduced.

The drying hopper 16 is an airtight container having a large volume cylindrical upper portion 24 and a conical lower portion 26, which is preferably connected directly to a processing machine such as the extruder 14. By connecting the lower portion 26 directly to the processor, the dry material is carried to the processor by gravity while it is still heated and under a reduced pressure. It is preferable to have the processor airtight to prevent air from entering the system at the bottom of the hopper.

Air is removed from the top of the drying hopper 16 through a pipe 28. The pipe 28 may be connected directly to the air-circulating blower 20, or preferably, to the input of a filter 30, which has an output 32 connected to the circulating blower 20. The filter 30 is of any conventional type, such as a cloth filter bag 34. If a filter is not used, resin particles and dust will collect in and eventually plug up the circulating blower 20, the vacuum pump 18 and the passage through the heater 22. Routine cleaning maintenance of the vacuum pump is greatly reduced by the use of a filter.

The air-circulating blower 20 may be any commercially available unit, such as a centrifugal blower or a squirrel cage blower. A pipe 36 extends from the output side of the blower 20 through the heater 22 and through the top of the drying hopper 16. The pipe 36 is then terminated near the bottom of the conical lower portion 26 of the hopper 16. A circular passage between the open lower end 38 of the pipe 36 and the conical lower portion 26 permits the downward flow of dried resin to the extruder 14 with a simultaneous upward flow of the drying air expelled from the open lower end 38 of the pipe 36.

It is preferred that the heater 22 is merely one or more electrical coils wrapped around the pipe 36. When several coils are used, a switch or thermostat (not shown) may be connected to regulate the air temperature by automatically turning the different coils on and off or by regulating the current in the coils. In another embodiment of the invention, the heater 22 comprises a coil of tubing carrying a heat transfer fluid which is placed either around or within pipe 36. In any case, the heater 22 must transfer sufficient heat to the circulating air to both evaporate any moisture in the hopper 16 and to raise the temperature of the material flowing through the hopper 16.

A pipe 40 is connected between the vacuum pump 18 and the closed air circulating system. Although the vacuum pump 18 can be connected at any point in the system which is unobstructed by the resinous material, it is preferable to connect it between the output side of the filter 30 and the heater 22. By protecting the vacuum pump 18 from excessive heat and resin dust, the periodic vacuum pump maintenance is greatly reduced.

Turning now to the resin flow system, a filler pipe 42 has one end buried in the synthetic resinous material 44 in the primary feeder hopper 12 and the other end connected to a filler head 46 located in the drier hopper 16. The filler head 46, shown in detail in FIG. 2, is designed to maintain a predetermined material level 48 in the hopper 16. As material is drawn from the bottom of the drying hopper 16, the open end 50 of the filler pipe 42 is exposed. The difference between the atmospheric pressure on the surface of material 44 in the primary feeder hopper 12 and the low internal pressure in the hopper 16 is sufficient to cause the material 44 to flow through the filler pipe 42. The material flow will continue until the material level in the hopper 16 reaches the end 50 of the filler pipe 42. A sleeve 52 of a diameter larger than that of the filler pipe 42 is spaced around and extends below the end 50 of the pipe 42. A screen 54 is connected between the filler pipe 42 and the top of the sleeve 52. The screen passes any air which may enter the hopper 16 with the material 44, but will not pass the material. The filler head 46 prevents the material from rising above the predetermined level determined by the end 50 of the filler pipe 42.

A little fresh air must enter the system to carry off the moisture evaporated from the resinous material. Some air will enter the drying hopper 16 through the filler pipe 42 along with the material 44. A fresh air inlet valve 56 may be provided to bleed additional air, when needed, into the system. Preferably, the valve 56 is located before the heater 22 such that the fresh air is heated before it is circulated through the drying hopper 16. For maximum drying, especially in a humid environment, the fresh air is dehumidified before it enters the system through the valve 56.

Referring now to FIG. 3, the flow diagram of a second embodiment of the invention is shown. In this embodiment an air-circulating pipe 58 is connected from the top of the drying hopper 16 to the input side of the circulating air blower 20. The fresh air inlet valve 56 is connected to the air-circulating pipe 58. An air return pipe 60 is connected from the output of the blower 20 to the conical lower portion 26 of the hopper 16. This last connection is made adjacent to the connection to the extruder 14, such that the circulating air flows upwardly through as much of the resin in the hopper 16 as possible. The circulating air is heated before it enters the hopper 16 by the heater 22, which surrounds the air return pipe 60.

The vacuum pump 18 is connected through a pipe 62 and a pipe 64 to the air-circulating pipe 58. This connection enables the vacuum pump 18 to maintain the system at a reduced pressure for increased drying efficiency and to remove the fresh air which enters the valve 56, carrying off any moisture evaporated from the resin. The pipe 62 is also connected to the top of a hopper feeder 66 to remove any air which may enter the system with the resin. A magnetic trap 67 may be located in the hopper feeder 66 for removing tramp iron from the material as it flows to the hopper 16. A filler pipe 68 has one end buried in a virgin material supply (not shown) and the other end connected to the hopper feeder 66. A valve 70 controls the flow of virgin material through the filler pipe 68. The valve 70 is operated by a conventional control circuit 72 which is connected to a sensor 74. The sensor 74 may be a simple pressure actuated switch placed to sense when the material held in the drying hopper 16 reaches the predetermined level 48. A hose 76 is connected from the filler pipe 68 to extrudate trimmers (not shown) to feed reground material continuously back into the dryer. For reduced maintenance, filters of a type similar to the filter 30 in FIG. 1 may be placed in either the line 58 or the line 62, or in both of these lines.

Apparatus employing a third embodiment of the invention is shown in FIG. 4. A blower 78 is attached near an edge of the top 80 of a drying hopper 82. The blower 78 withdraws air from the drying hopper 82 and forces it upwardly through the space between two concentric pipes 84 and 86. A heater 88 surrounds the pipe 84 for heating the air as it is forced upwardly. The heated air flows between a removable cover 90 and the top of the pipe 86 and then downwardly through the pipe 86. At the top 80 of the hopper 82, the pipe 86 is joined to a pipe 92 which depends into the hopper 82. The pipe 92 terminates in an air-dispersing head 94 which includes a number of concentric baffle rings 96 spaced from the conical lower portion 98 of the hopper 82. Hot air passes from the dispersing head 94 upwardly through the material held in the hopper 82 and back through the blower 78 for recirculation. A pipe 100, attached adjacent to the output of the blower 78, is connected to a vacuum pump 102 for maintaining a subatmospheric pressure within the system. A filter 104 may be connected in the pipe 100. The vacuum pump 102 can be a Roots-type suction pump, which will work satisfactorily without the filter 104. However, it appears that a properly lubricated and filter protected piston pump will have a better service life.

A hopper feeder 106 is attached to the top 80 of the drying hopper 82. A filler pipe 108 is connected from a primary material feeder hopper (not shown) to a filler head 110 (similar to that shown in FIG. 2) spaced at a predetermined position within the hopper feeder 106. The subatmospheric pressure within the system draws material from the primary feeder hopper, through the pipe 108, into the hopper feeder 106. As material in the drying hopper 82 is consumed by the extruder 112, material flows past a magnetic tramp iron trap 114 within the hopper feeder 106 and into the drying hopper 82. A pipe 116 is attached from the upper portion of the hopper feeder 106 to the vacuum pump 102 for removing any air which may enter the system through the filler pipe 108, before such air can enter the drying hopper 82.

This arrangement of the vacuum drier has the advantages of low maintenance, and, when cleaning is necessary, of easy access to the parts which require cleaning. There are no orifices or narrow apertures to be clogged by the circulation of dust or granules through the air heater system. When the air heater system needs cleaning, the cover 90 is easily removed from the pipe 84, exposing the inside of the heater. Where the system is to be operated continuously for long periods of time, it may be desirable to place two of the filters 104 in parallel with suitable shutoff valves such that either filter can be cleaned while the other continues to operate.

Referring now to FIGS. 5 and 6, a preferred form of a continuous vacuum drier 120 is shown in detail. The drier 120 includes a drying hopper 121 which is filled with raw material from a hopper feeder 122 and delivers the raw material, in dry form, to an extruder 123 or other suitable processors. As the material passes downwardly through the hopper 121, a blower 124 forces air downwardly through the material. The air is drawn into a conical head 125 positioned adjacent a conical lower end portion 126 of the hopper 121 and upwardly through a conduit 127 in the center of the hopper 121. A stater 128 having a number of fixed, radial extending vertical fins is positioned below the blower 124 for directing the air flow downwardly into the material in the hopper 121.

The drier 120 is filled with material in a manner similar to that described above for the embodiment of FIG. 4. A filler pipe 120 extends from a primary material feeder hopper (not shown) to a head 130 positioned within the hopper feeder 122. A line 131 is connected from the hopper feeder 122 through a suitable filter 132 to a vacuum pump 133. The vacuum pump 133 reduces the air pressure within the hopper feeder 122 such that material is drawn through the filler pipe 129 into the hopper feeder 122. The material level in the hopper feeder 122 is continuously maintained at the level of the head 130. As dry material is withdrawn from the hopper 121 for processing, material flows downwardly through the hopper feeder 122, past a magnetic tramp iron trap 134 and through a plurality of conduits 135 into the hopper 121. Material flow from the hopper feeder 122 and through the hopper 121 is accomplished through gravity. The line 131 is also connected to the top of the hopper 121 for maintaining the interior of the hopper at a subatmospheric pressure.

As the material flows downwardly through the drying hopper 121, it passes a plurality of grids of heating pipes 136. The pipes 136 are positioned and shaped such that the material passes within 4 inches, and preferably within 1 inch, of a pipe as the material moves downwardly through the hopper 121. A pump 137 circulates a heat transfer fluid, such as water, from a reservoir 138, through the pipes 136 and back to the reservoir 138. The water in the reservoir 138 is maintained at a predetermined temperature by one or more electric submersion heaters (not shown).

With the arrangement shown in FIG. 5, both the circulated air and the material passing through the hopper 121 are efficiently heated. Since both the air and the material are heated and the hopper 121 is maintained at a subatmospheric pressure, the drying operation is very efficient. A controlled amount of dry air may be bled into the hopper 121 to carry off evaporated moisture, further increasing the efficiency of the drier 120.

In each of the four embodiments of the invention shown in FIGS. 1, 3, 4, and 5, the drying operation may be improved by the addition of a mixer or blender (not shown) within the drying hopper.

Although the continuous vacuum drier of the instant invention has been described in particular for use with synthetic resinous materials, the drier may be used with other granular materials. The drier may, for example, be used to dry grain prior to storage. It will be appreciated that various other modifications and changes may be made to the continuous vacuum drier without departing from the spirit and the scope of the appended claims.

What I claim is:

1. Apparatus for holding and drying granular materials, comprising, a closed hopper having a bottom portion, means for filling said hopper with granular material to a predetermined level, means for withdrawing the granular material from the bottom of said hopper, an air circulating blower having an input operatively connected to said hopper above said predetermined level and having an output operatively connected to return air withdrawn from said hopper back into said hopper near the bottom such that the air is circulated through the material held in said hopper, and means for withdrawing air from said hopper to maintain the interior of said hopper at a subatmospheric pressure.

2. The apparatus of claim 1 including means for heating the air before it is returned back into said hopper.

3. The apparatus of claim 2 including means on the input side of said blower for filtering the air withdrawn from said hopper.

4. The apparatus of claim 2 including a feed conduit providing communication from the exterior to the interior of said hopper, said conduit having an end exterior to said hopper for burying in a supply of granular material and an end interior to said hopper, whereby when said exterior end of said feed conduit is buried in a supply of granular material subject to a surface pressure above the subatmospheric pressure on the interior of said hopper, the material flows through said conduit into said hopper as a consequence of the pressure difference between the supply and the interior of said hopper.

5. Apparatus for holding and drying granular materials, comprising, a closed hopper having a top portion and a bottom portion, means for continuously filling said hopper with granular material, means for removing air from the granular material before it enters said hopper, means for continuously withdrawing the granular material from the bottom of said hopper, control means for regulating the flow of material to said hopper for maintaining a predetermined material level in said hopper, means for withdrawing air from the top of said hopper and for returning the air to the bottom of said hopper, means for heating the air before it is returned to the bottom of said hopper, means for maintaining said hopper at a subatmospheric pressure, and means for bleeding a controlled amount of air into said hopper.

6. A method for continuously drying granular materials said method comprising, charging the material into the top portion of a closed hopper having a top portion and a bottom portion to maintain a predetermined material level and withdrawing dried material from the bottom portion of the hopper, circulating an airstream from the top portion of the hopper and back to the bottom portion of the hopper, heating the circulated airstream, and withdrawing an airstream from the hopper to maintain a subatmospheric pressure therein.

7. A method for continuously drying granular materials as claimed in claim 6, and including bleeding a controlled amount of air into said hopper.

8. Apparatus for holding and drying granular materials prior to processing into finished products, comprising, a closed hopper having a bottom portion, means for filling said hopper with granular material to a predetermined level, means for withdrawing the granular material from the bottom of said hopper, an air circulating blower having an input and an output, both operatively connected to said hopper, one above and one below said predetermined level whereby air withdrawn from said hopper by said blower is returned to said hopper and is circulated through the material held in said hopper, and means for withdrawing air from said hopper to maintain the interior of said hopper at a subatmospheric pressure.

9. Apparatus for holding and drying granular materials, as defined in claim 8, and including means for heating the material in said hopper and for heating the air as it is circulated through said hopper.

10. Apparatus for holding and drying granular materials, as defined in claim 9, wherein said heating means comprises at least one pipe extending through the material in said hopper and means for circulating a heated heat transfer fluid through said pipe.

11. Apparatus for holding and drying granular materials, as defined in claim 10, wherein said pipe is shaped and positioned such that the material passes within 4 inches of said pipe as the material moves downwardly through said hopper.

12. A method for continuously drying granular materials, said method comprising, charging the material into the top portion of a closed hopper having a top portion and a bottom portion to maintain a predetermined material level and withdrawing dried material from the bottom portion of the hopper, circulating an airstream from the bottom portion of the hopper and back to the top portion of the hopper, heating the material as it passes through the hopper, and withdrawing an airstream from the hopper to maintain a subatmospheric pressure therein.

13. A method for continuously drying granular materials, as claimed in claim 12, and including bleeding a controlled amount of air into said hopper.

14. Apparatus for holding and drying synthetic resinous materials prior to processing into finished products, comprising, a closed hopper having a bottom portion, means for maintaining said hopper filled to a predetermined level with synthetic resinous material, means for withdrawing the synthetic resinous material from the bottom of said hopper, an air-circulating blower having an input and an output, both operatively connected to said hopper, one above and one below said predetermined level whereby air withdrawn from said hopper by said blower is returned to said hopper and is circulated through the material held in said hopper, and means for withdrawing air from said hopper to maintain the interior of said hopper at a subatmospheric pressure.

15. Apparatus for holding and drying synthetic resinous materials, as defined in claim 14, and including means for heating the synthetic resinous material in said hopper.

16. Apparatus for holding and drying synthetic resinous materials, as defined in claim 14, wherein said means for withdrawing material from said hopper includes an extruder for processing the synthetic resinous material held in said hopper and means providing a closed operative connection from the bottom portion of said hopper to said extruder.

17. Apparatus for holding and drying synthetic resinous materials, as defined in claim 14, wherein said means for withdrawing material from said hopper includes injection-molding apparatus for processing the synthetic resinous material held in said hopper and means providing a closed operative connection from the bottom portion of said hopper to said injection-molding apparatus.